G. CHRISTENSON.
SLACK TAKE-UP FOR FLUID PRESSURE BRAKE SYSTEMS.
APPLICATION FILED JULY 22, 1916.
1,251,641.
Patented Jan. 1, 1918.
2 SHEETS—SHEET 1.
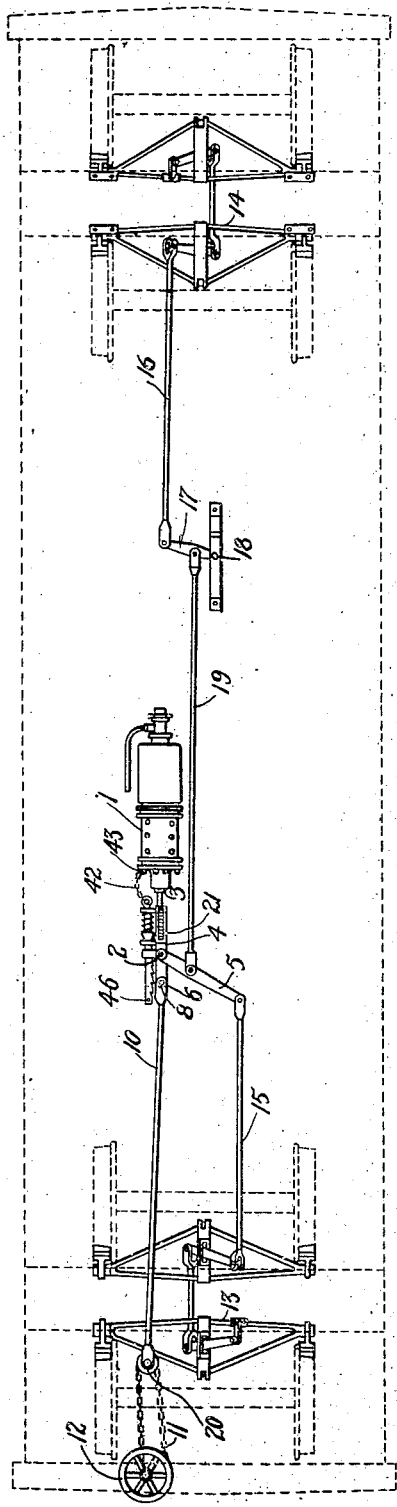
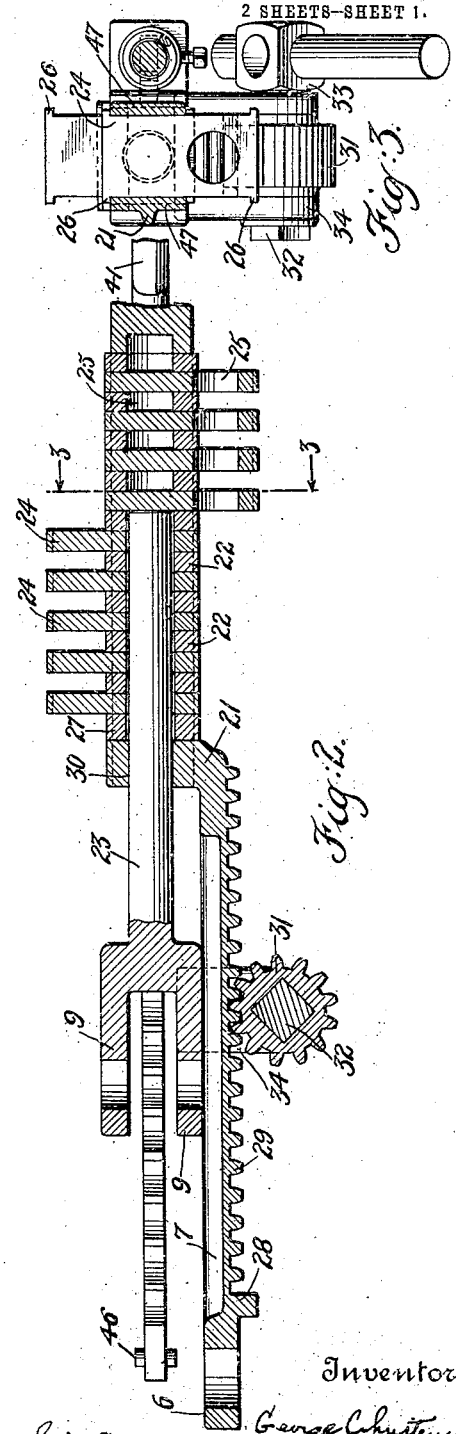
Inventor
George Christenson
By his Attorney G. CHRISTENSON.
SLACK TAKE-UP FOR FLUID PRESSURE BRAKE SYSTEMS.
APPLICATION FILED JULY 22, 1916.
1,251,641.
Patented Jan. 1, 1918.
2 SHEETS—SHEET 2.
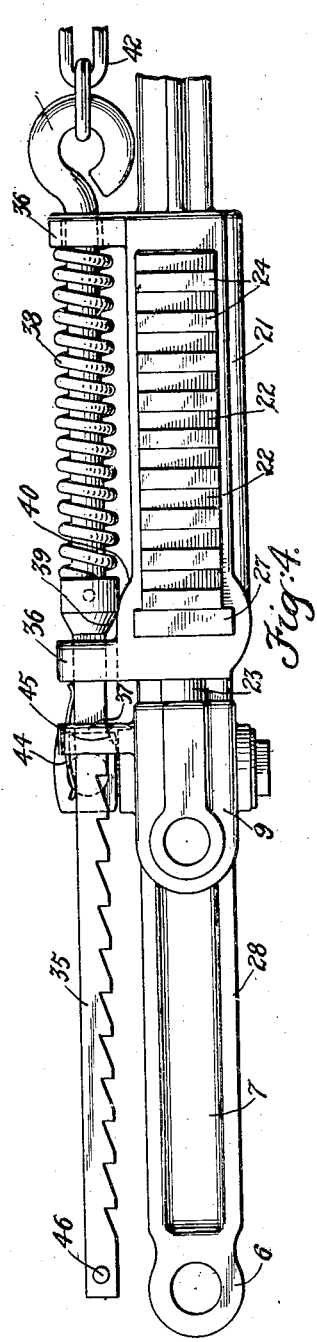
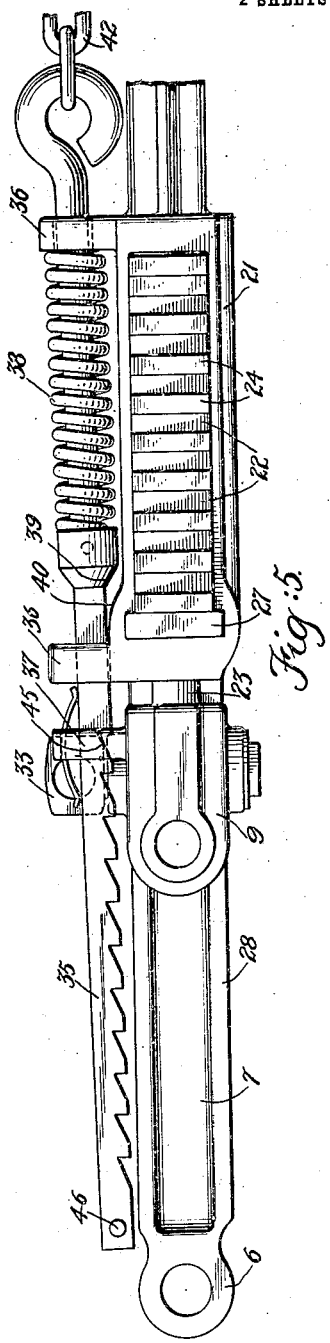
Inventor:
George Christenson
By his Attorney

UNITED STATES PATENT OFFICE.

GEORGE CHRISTENSON, OF JAMAICA, NEW YORK, ASSIGNOR TO H. W. JOHNS-MANVILLE COMPANY, A CORPORATION OF NEW YORK.

SLACK-TAKE-UP FOR FLUID-PRESSURE BRAKE SYSTEMS.

1,251,641.     Specification of Letters Patent.     Patented Jan. 1, 1918.

Application filed July 22, 1916. Serial No. 110,802.

*To all whom it may concern:*

Be it known that I, GEORGE CHRISTENSON, a citizen of the United States of America, residing at Jamaica, county of Queens, State of New York, have invented certain new and useful Improvements in Slack-Take-Ups for Fluid-Pressure Brake Systems, of which the following is a specification.

My invention relates generally to take-up devices for fluid pressure brakes of the type shown and described in Letters Patent Nos. 1,158,177, 1,184,681 and 1,184,683, previously issued upon my applications, and is more especially designed to improve the construction thereof and to also render the same automatic. To this end my present invention, in addition to improved mechanism by which an operator may manually adjust the brake connections while the brakes are set and the brake rigging is under tension so as to allow the piston only a standard amount of travel during the heaviest brake application, also embodies a simple attachment by which the slack produced by further brake shoe wear or other causes may be automatically taken up from time to time when exceeding a predetermined amount, so as to uniformly maintain piston travel within a predetermined standard limit. With my present improvement the manually operated apparatus is only brought into use when new brake shoes are put in, or when some other readjustment of the brake rigging is necessary, or when the automatic attachment is disabled, but the capacity for both automatic and manual adjustment produces a double factor of safety, and, while the present system of adjusting brakes to standard travel before the train leaves the yard where it is made up may be most conveniently carried out, the automatic maintenance of that standard throughout the run is also assured. My invention presents other features of improvement hereinafter pointed out.

The best form of apparatus embodying my invention at present known to me is illustrated in the accompanying two sheets of drawing in which:

Figure 1 is a plan view of a standard form of freight brake rigging with my invention applied thereto, the outline of the car body and wheels being shown in dotted lines.

Fig. 2 is a vertical, central section of the push rod and associated parts, on an enlarged scale.

Fig. 3 is a cross section on line 3—3 of Fig. 2 looking in the direction of the arrow.

Fig. 4 is a detail plan view of the same parts shown in normal position, and

Fig. 5 is a similar view showing the position of the parts at the beginning of a take-up operation.

Throughout the drawing like reference figures indicate like parts.

1, is the usual air brake cylinder and piston with hollow piston rod 3, in which is loosely mounted a push rod 4, of peculiar construction. This push rod is preferably made of malleable iron, and immediately beyond the point at which it emerges from the hollow piston rod it has a widened, longitudinally slotted portion 21, in which are mounted a series of perforated shims hereinafter to be described. Through a hole 30 in the forward end of the part 21 slides the plunger 23, which has ears 9, 9, at its outer end forming a clevis connection with floating lever 5 by means of pin 2. Beyond the slotted part 21, the push rod continues farther in the shape of an extension 28, preferably on the lower side, parallel to plunger 23, and grooved at 7, on its upper face to receive the end of pin 2, and so serve as a guide for the plunger. The outer end of push-rod extension 28, is provided with any suitable means for attachment to the usual hand-operated braking mechanism, which as here shown consists of an eye 6, to which tension rod 10, is connected by pin 8 (see Fig. 1). The other end of tension rod 10, carries the usual pulley 20, around which runs chain 11, to hand wheel 12. The standard brake rigging is represented by the truck rigging 13 and 14, the tension rods 15 and 16, the multiplying lever 17, pivoted to the car body at 18, and tie rod 19, all of standard construction.

The system of shims consists of two series, one composed of short perforated shims 22, 22, fixed in slot 21, or movable only longitudinally thereof and serving as guides for the inner end of plunger 23, the other composed of a series of longer, perforated shims 24, 24, preferably interleaved or alternating with the short shims. All shims have similar perforations 25, just large enough to admit plunger 23, and all shims, as shown, have transversely extending lugs 26, at their upper and lower ends which engage the side of slotted portion 21, of the push rod, and limit up and down motion of the shims. The shims 22, are so short that their ears 26, permit no movement transversely of the plunger and their perforations 25, are central thereof. The longer shims 24, are capable of limited vertical motion and have their perforations 25, in their lower parts so that when the shims are up their perforations are in line with opening 30, in the forward end of 21, and consequently in line with plunger 23, but are out of line therewith when the shims are down, both as well shown in Fig. 2.

At the outer end of part 21 there are vertical grooves 47, 47, in its inner side faces in which fits a wide shim or keeper 27, which has no lugs on its lower end. Consequently this keeper can be lifted out, when the plunger 23, is withdrawn, and all the shims 22, and 24, can then be slid along to slots 47, 47, and lifted out, these slots being deep enough to allow lugs 26, on all these shims to pass. A reversal of this operation will load the shim holding frame again with a full set of shims.

The foregoing description sets out in substance a standard freight brake rigging with a special form of telescoping push rod for taking up slack and adjusting piston travel. This telescoping piston rod may be operated in either of two ways, first, by a manually operated device such as one of those shown in my previous patents, and secondly, by an automatic attachment here disclosed for the first time.

The preferred form of manually operated device here illustrated is composed of rack teeth 29, on the under side of push rod extension 28, a pinion 31, meshing therewith mounted on shaft 32, journaled in ears 34, depending from plunger head 9, and having a capstan head 33.

The preferred form of automatic attachment shown, (though many substitute forms could be easily devised to operate upon the same general principle) is composed of a ratchet bar 35, mounted in guides or housings 36, 36, on one of the telescoping elements, such as the push rod part 21, and movable both longitudinally and transversely therein so as to intermittently engage any convenient projection, as 45, on the other telescoping element, the plunger 23 (see Fig. 5). This projection 45, as here shown, forms the bottom of the slot in housing or guide 37, on plunger 23. This slot is long enough to permit the ratchet bar 35, to move away from plunger 23, far enough to have its teeth disengage from projection 45 (see Fig. 4). 39 is a cam surface on ratchet bar 35, and 40, is a coöperating cam surface on the push rod part 21, the two coöperating to shove the ratchet bar away from push rod and plunger when the cam faces are forced together by strong spiral spring 38, as shown in Fig. 4. A lighter spring 44, preferably mounted in housing 37, on the plunger head tends to shove the ratchet bar toward the plunger and so cause its teeth to engage the projection 45, on said plunger when the cams are not engaged, all as shown in Fig. 5. 41, is an eye or hook on the rear end of ratchet bar 35, by which tension may be exerted to pull it back through an ample movement and compress strong spring 38, thereby freeing cam faces 39, 40, from engagement and permitting light spring 44 to do its work. This tension is exerted at the proper time by any suitable lost motion connection, such as chain 42, fastened to any point fixed with relation to the brake cylinder, such as one of the cylinder fastening bolts, 43. (See Fig. 1.)

46, is a stop pin or transverse projection from the end of ratchet bar 35, adapted to engage housing 37, and prevent the plunger 23, being pulled out so far as to entirely free itself from the push rod part 21.

In setting the slack adjuster the parts are manually adjusted by inserting a lever or rod in capstan head 33, and rotating pinion 31 (the brake rigging preferably being first put under tension by an ordinary application of compressed air) to force back push rod 4, from plunger 23, until the piston in cylinder 1, is also forced back to the standard point of maximum travel, say eight inches. One or more shims 24, will drop in front of the end of plunger 23 and hold these two telescoping elements in their new position of adjustment. If, after the train has been out on the road for some time much use of the brakes has worn down the shoes and created an amount of slack such that the piston travels beyond eight inches, the lost motion in chain connection 42, will be taken up on each brake application in which such excess piston travel occurs and ratchet bar 35, instead of traveling back and forth with the push rod, will at that moment be held stationary—after it has moved with the piston through the permissible eight inches. Further movement of the push rod and plunger 23, (excess piston travel) will pull the parts into the position shown in Fig. 5, where strong spring 38, has been flexed, the cam surfaces 39, 40, disengaged and light spring 44, has moved the ratchet bar toward the plunger 23, and caused one of the ratchet teeth to engage projection 45, thereon. When the brakes are released, spring 38, will again overpower light spring 44, flexing it back into position shown in Fig. 4, and freeing the teeth from engagement with plungers 23. Before such disengagement occurs, however, the plunger will have been pulled out of the shim holding part 21, of the push rod 4, by the return movement of ratchet bar 35, far enough to permit a long shim to drop behind it and hold it in its new position relative to the push rod and piston. This will thereafter hold the piston back within the limits of standard eight inch travel until further brake shoe wear causes a repetition of the operation above described.

The ratchet teeth being normally out of engagement do not interfere with manual adjustment of the parts when the brake rigging is not under tension, and if an engagement of the ratchet teeth is produced when the brakes are set hard preliminarily to a manual adjustment, that manual adjustment, by forcing the piston and push rod inwardly to the limiting position of standard travel, automatically disengages the ratchet teeth by forcing cam 40, against cam surface 39, the parts then resuming the normal position shown in Fig. 4.

Among other advantages of my improved apparatus, the use of the series of short shims 22, saves weight, forms an efficient guide for the plunger 23, and enables the operator, when resetting the apparatus, to readily tell by his sense of feeling how many of the long shims he is raising. The shims in this construction would be each made of half the thickness of those shown in my prior patents to secure the same fineness of adjustment.

Having described my invention, I claim:

1. In a take-up device for railway brake systems and the like the combination, with a frame and a plunger rod mounted to slide longitudinally in said frame, of a series of perforated shims mounted in said frame in line with said plunger rod, certain of said shims being held against motion transversely of the plunger and with their perforations in line with said plunger, and others of said shims being capable of limited motion transversely of the plunger so as to bring their perforations either into line with the plunger or out of line therewith.

2. In a take-up device for railway brake systems and the like the combination, with a horizontal frame and a plunger mounted to slide into said frame, of a series of perforated shims mounted in said frame free to move individually up and down within limits sufficient to bring their perforations up into line with said plunger or down out of line therewith, and perforated guide members incapable of vertical motion spanning said frame between the movable shims.

3. As an element in a take-up apparatus for fluid pressure brake systems the combination of a rectangular frame having a perforation at one end and partly cut-away portions adjacent thereto, a plunger adapted to slide in said perforation, a series of perforated shims movable transversely in said frame provided with lugs at either end limiting their transverse movement except when opposite said cutaway portions, and a keeper adapted to fill said cutaway portions in the frame and interlock with said rod against transverse movement when all parts are in operative position, together with a second series of shorter perforated shims locked in the frame against movement transversely thereof but capable of longitudinal movement toward and from the above mentioned cutaway portion in common with the longer shims.

4. A push rod adapted for use in railway brake systems, which push rod is provided with a slotted portion, a series of vertically movable shims located in said slot, a plunger adapted to slide longitudinally along said slot, a rack mounted on the slotted portion and parallel to the plunger, a pinion mounted on the plunger engaging said rack, and means for rotating said pinion, whereby the position of said plunger relative to the other elements above recited may be adjusted.

5. A push rod adapted for use in railway brake systems which has a telescoping plunger adapted to be connected to the brake rigging, a rack mounted on the push rod, a pinion journaled on the plunger engaging the rack, manually operated means for rotating the pinion to adjust the position of the plunger in different positions of adjustment and independent automatic means for holding the plunger in different positions of adjustment.

6. A push rod adapted for use in railway brake systems, which push rod is provided with a slotted portion, a series of vertically movable shims located in said slot, a plunger adapted to slide longitudinally along said slot, a rack mounted on the slotted portion and parallel to the plunger, a pinion mounted on the plunger engaging said rack, and means for rotating said pinion, whereby the position of said plunger relative to the other elements above recited may be adjusted, said rack bar being provided at its outer end with means for attachment to a hand-operated braking mechanism.

7. In a take-up apparatus for fluid pressure brake systems the combination, with the cylinder and piston, of an expansible, telescoping push rod for the piston, means for holding the rod in various positions of expanded adjustment, automatically operated means for forcing the push rod outwardly and positive manually operated means for forcing said push rod either inwardly or outwardly.

8. In an air brake system the combination, with the usual brake rigging, cylinder, and piston connected to the brake rigging and movable in the cylinder, of means for adjusting the position of the piston relatively to the brake rigging by positively forcing the same inwardly in the cylinder while the brakes are set and means for automatically effecting said adjustment when the brakes are released.

9. In a take-up apparatus for fluid pressure brakes the combination, with means for taking up excess piston travel capable of manual operation while the brake system is set under tension, of an attachment for operating said means automatically when the brakes are released after any application in which a predetermined amount of excess piston travel has occurred.

10. In a take-up system for fluid pressure brakes the combination, with two members capable of sliding longitudinally one upon the other and automatic means for holding them in different positions of relative adjustment, of a ratchet bar mounted on one member, capable of longitudinal motion thereon and extending parallel to both, a projection on the other member adapted to engage the teeth on the ratchet bar but normally disengaged therefrom, means for moving said ratchet bar longitudinally from its normal position and causing it to engage said projection when in an abnormal position, and yielding pressure means for returning said ratchet bar to its normal position of disengagement but retaining it in engagement with the projection during a portion of its return movement.

11. In a take-up system for fluid pressure breaks the combination, with two members capable of sliding longitudinally one upon the other and automatic means for holding them in different positions of relative adjustment, of a ratchet bar mounted on one member, capable of longitudinal motion thereon and extending parallel to both, a projection on the other member adapted to engage the teeth on the ratchet bar but normally disengaged therefrom, means for moving said ratchet bar longitudinally from its normal position and causing it to engage said projection when in an abnormal position, and yielding pressure means for returning said ratchet bar to its normal position of disengagement but retaining it in engagement with the projection during a portion of its return movement, together with manually operated means for adjusting the relative position of the first mentioned two members.

12. In a take-up system for fluid pressure brakes the combination, with two members capable of sliding longitudinally one upon the other and automatic means for holding them in different positions of relative adjustment, of a ratchet bar mounted on one member, capable of longitudinal motion thereon and extending parallel to both, a projection on the other member adapted to engage the teeth on the ratchet bar but normally disengaged therefrom, means for moving said ratchet bar longitudinally from its normal position and causing it to engage said projection when in an abnormal position, and yielding pressure means for returning said ratchet bar to its normal position of disengagement but retaining it in engagement with the projection during a portion of its return movement, together with manually operated means for adjusting the relative position of the first mentioned two members, said last mentioned means comprising a rack on one member and a pinion journaled on the other member and meshing with the rack.

13. In a take-up system for fluid pressure brakes the combination, with two members capable of sliding longitudinally one upon the other and automatic means for holding them in different positions of relative adjustment, of a ratchet bar mounted and movable on one member in guides holding it substantially parallel to both but permitting a slight transverse movement toward and from the second member, a projection on the second member capable of engaging with or disengaging from the ratchet bar by virtue of said transverse to and fro movement, a light spring normally tending to force said ratchet bar toward the second member and into engagement with the projection thereon, a cam bearing between the first member and ratchet bar adapted to move the ratchet teeth away from the second member and out of engagement therewith when the ratchet bar is forced along and toward the second member, and a second more powerful spring normally tending to so move said ratchet bar and engage said cam bearing, whereby said ratchet teeth are normally held out of engagement with the said projection but when the ratchet bar is moved longitudinally toward the first member the teeth are forced into engagement with the said projection and when the ratchet bar is released the more powerful spring forces it back, the lighter spring holding the teeth engaged until the cam bearing disengages them at the end of the return movement.

14. In a fluid pressure brake system the combination, with a push rod, plunger therein and series of shims for holding said plunger in various positions of adjustment in the push rod, of a ratchet bar extending parallel to the plunger and mounted in guides on the push rod which permits ample longitudinal motion and slight transverse motion relative thereto, a projection on the plunger adapted to intermesh with the teeth on the ratchet bar, a light spring carried by the plunger tending to produce such intermeshing, a cam on the push rod, a coöperating cam on the ratchet bar, a more powerful spring on the push rod tending to force the ratchet bar out along the plunger and the cams together so as to separate the plunger and ratchet bar and disengage the teeth, and means for limiting the movement of the ratchet bar, whereby when the push rod and plunger exceed a predetermined extent of travel the ratchet bar becomes stationary, any further movement of the push rod and plunger cause the ratchet teeth to intermesh and on the return movement of the push rod and plunger the ratchet bar forces the plunger out from the push rod until the normal position of disengagement of the ratchet teeth is reëstablished and the dropping down of one or more shims holds the plunger in its newly assumed position in the push rod.

15. In a fluid pressure brake system, the combination, with the usual cylinder, piston and brake rigging, of a plunger adapted to be connected at its outer end to said brake rigging and having a series of shims for holding it in different positions of adjustment relative to the piston, a spring controlled ratchet bar normally out of engagement with the plunger and tending to move with the piston, a lost motion connection between the ratchet bar and a point fixed in relation to the cylinder, and means causing the ratchet bar to engage the plunger after the limit of the lost motion connection has been exceeded by a motion of the piston and the springs thereby flexed, whereby when said excess piston movement equals or exceeds the distance between two shims centers the returning of the springs to normal position upon a slackening of the lost motion connection will cause the ratchet bar to force the plunger outward relatively to the piston a distance sufficient to permit another shim to be inserted behind it.

16. A telescoping rod comprising in combination a shim holding frame, a plunger therein, a spring controlled ratchet bar mounted on the frame, adapted to feed the plunger outward with a step by step motion, passing through a housing on said plunger, and a stop on the end of the ratchet bar coöperating with the housing to prevent the plunger being entirely withdrawn from the shim-holding frame.

17. An adjustable push rod comprising in combination a shim holding frame, a plunger passing therethrough, an extension for the shim holding frame parallel with and adjacent to the plunger, provided with a groove in its surface next to the plunger, and a transverse projection from the outer end of the plunger engaging said groove and moving therein as the plunger is reciprocated.

GEORGE CHRISTENSON.

Copies of this patent may be obtained for five cents each, by addressing the "Commissioner of Patents, Washington, D. C."